United States Patent

Yeh

Patent Number: 5,624,116
Date of Patent: Apr. 29, 1997

[54] GRIP FOR SPORTS RACQUET

[75] Inventor: Kent Yeh, Plainsboro, N.J.

[73] Assignee: Prince Sports Group, Inc., Bordentown, N.J.

[21] Appl. No.: 553,723

[22] Filed: Oct. 23, 1995

[51] Int. Cl.$^6$ .................................................. A63B 49/08
[52] U.S. Cl. ........................... 473/538; 473/302; 473/549
[58] Field of Search ................... 273/733, 75; 473/300, 473/301, 302, 303

[56] References Cited

U.S. PATENT DOCUMENTS

| | | | |
|---|---|---|---|
| 1,139,843 | 5/1915 | Brown | 473/302 |
| 1,435,088 | 11/1922 | Smith | 473/302 |
| 3,140,873 | 7/1964 | Goodwin | 473/302 |
| 4,174,109 | 11/1979 | Gaiser | 273/75 X |
| 4,907,810 | 3/1990 | Whiteford | 273/75 X |
| 5,397,123 | 3/1995 | Huang | 473/302 X |

FOREIGN PATENT DOCUMENTS

| | | | |
|---|---|---|---|
| 2039830 | 8/1980 | United Kingdom | 273/75 |
| 2069850 | 9/1981 | United Kingdom | 273/75 |

Primary Examiner—William E. Stoll
Attorney, Agent, or Firm—White & Case

[57] ABSTRACT

A grip for a sports racquet, such as a tennis racquet, a squash racquet, a badminton racquet, or a racquetball racquet, comprises a thin layer of synthetic material and a porous backing material, e.g., felt. One or more longitudinal channels are formed in the thin synthetic layer to expose the backing material, thereby allowing moisture to pass directly to the backing material. The channel or series of channels run substantially coextensive with the grip, so that when the grip is wound onto a sports racquet handle, the channel or channels will be provided about the handle along its length. The exposed surface of the backing material may have a different color than the outer strip, to produce a pleasing decorative appearance. Also, in a preferred embodiment, a pair of parallel channels extend substantially the length of the strip, and a pair of parallel stitch lines, located between the channels, compress the outer surface of the strip to create a raised section. The stitching and raised surface form a textured gripping surface when the grip is wound onto a sports racquet handle.

14 Claims, 4 Drawing Sheets

GRIP FOR SPORTS RACQUET

FIELD OF THE INVENTION

The present invention is directed to a grip for an implement, such as a sports racquet, e.g., a tennis, squash, badminton, or racquetball racquet, of the type having an elongated handle about which the grip is wrapped.

BACKGROUND OF THE INVENTION

Sports racquets, such as tennis, squash, badminton, and racquetball racquets, have a frame forming a head portion, defining a strung surface area for hitting a ball, and an elongated handle that extends from the head portion. The handle is generally octagonal in cross-section. The handle may be formed by securing a pallet, having the desired octagonal outer shape, to the shank portion of the frame. In conventional racquets, this pallet is hard. However, a particularly advantageous handle is the cushion grip employed in certain models of Prince® tennis racquets, such as the Prince Vortex® tennis racquet, in which a cushion pallet slides over, and is secured to, the shank. Alternatively, if a lighter weight racquet is desired, the handle may be formed directly by molding the shank portion of the frame into the desired octagonal cross-sectional shape, which is referred to as a "molded-in" handle. This latter construction is employed in certain other models of Prince tennis racquets, such as the Prince Extender® line of racquets.

In either type of construction, the outer octagonal surface of the handle is covered by a grip, in the form of a strip of leather or synthetic leather material which is wrapped helically about the handle.

A typical synthetic leather grip comprises a felt backing layer and a top layer consisting of a thin coating of polymeric material, such as polyurethane, which is bonded to the upper surface of the felt backing. Also, double sided adhesive tape is usually applied to the bottom surface of the felt backing to help secure the grip to the racquet handle.

It has previously been proposed to form textures or surface designs on the outer surface of the grip. For example, it has been proposed to heat stamp patterns or logos into the polyurethane, to abrade the polyurethane in various patterns, to provide raised portions or stitching, or to form perforations of various sizes or geometric patterns through the grip.

SUMMARY OF THE INVENTION

A synthetic grip for a sports racquet, such as a tennis racquet, a squash racquet, a badminton racquet, or a racquetball racquet, comprises a thin layer of polymeric material and a porous backing material, e.g., felt. One or more longitudinal channels are formed in the thin polymeric layer to expose the backing material, thereby allowing moisture to pass directly from the grip outer surface to the more absorbent backing material. The channel or series of channels run substantially coextensive with the grip, so that when the grip is wound onto a sports racquet handle, a series of channels will be present along at least most of the handle.

The exposed surface of the backing material may have a differrent color than the outer polymeric layer, to produce a pleasing decorative appearance. Also, in a preferred embodiment, a pair of parallel channels extend substantially the length of the grip, and a pair of parallel stitch lines, located between the channels, compress the polymeric layer to create a raised portion. The stitching and raised surface form a textured gripping surface when the grip is wound onto a sports racquet handle.

The channel or channels are preferably machined into the grip through the top layer of polyurethane or other surface material to expose the underlying layer of felt or other backing. The channels can be of various geometric configurations, for example, continuously linear, linear at regular intervals of varied length (such as dashed lines), or aligned along multiple axes of orientations, e.g., herringbone.

A grip according to the present invention provides a number of novel features. Forming channels to expose the underlying backing material, particularly if it is a contrasting color, produces a striking new appearance. The grip has substantially improved moisture absorption compared to non-perforated and even perforated grips, due to the large surface exposed area of the underlying felt, and the tendency of the stitching and felt act to wick away moisture. Further, the channels form treads, engaging the skin for improved gripping qualities especially when wet. Also, due to the fact that there is substantially more material removed, the grip will be somewhat lighter than conventional grips.

For a better understanding of the invention, reference is made to the following detailed description of preferred embodiments, taken in conjunction with the drawings accompanying the application.

DETAILED DESCRIPTION OF PREFERRED EMBODIMENTS

Figure 1:
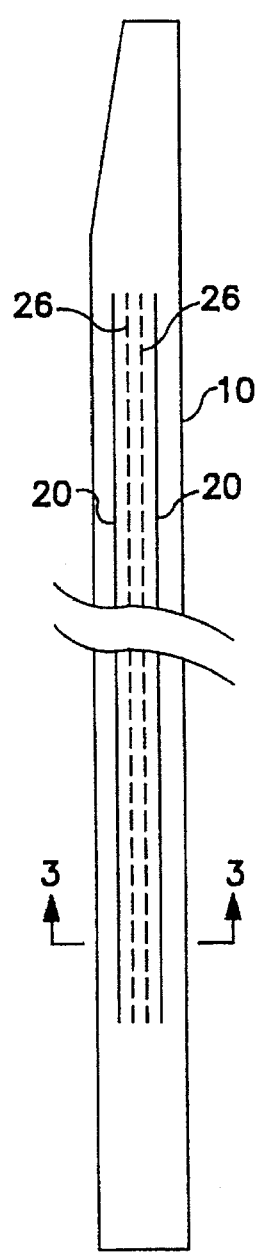
FIG. 1 is a top view of a grip.
Figure 2:
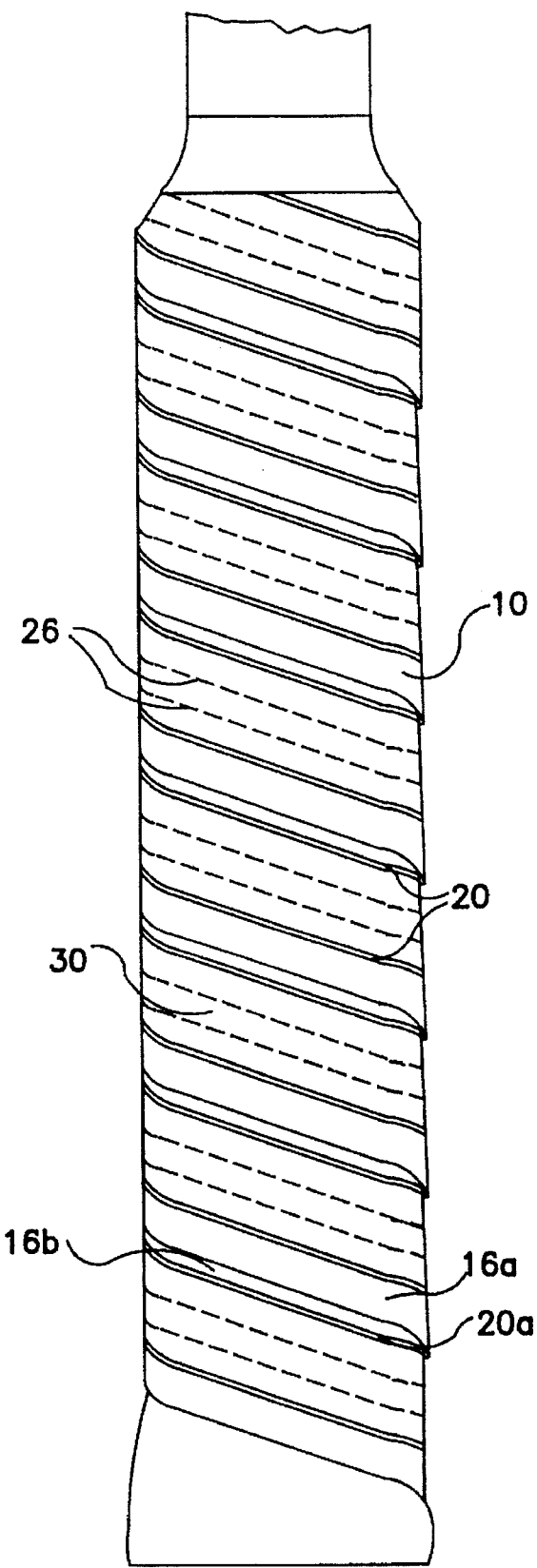
FIG. 2 is a front view of a tennis racquet handle, having the grip of FIG. 1 wound thereon.
Figure 3:
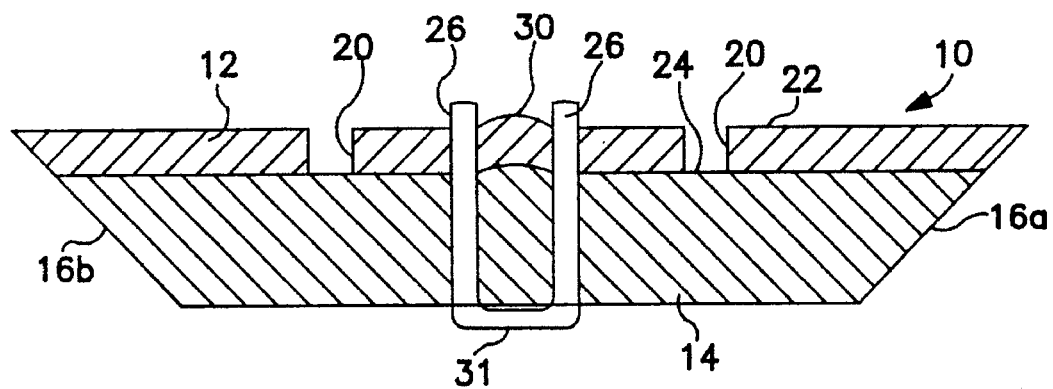
FIG. 3 is an enlarged cross-sectional view of the grip of FIG. 1, taken through lines 3—3 of FIG. 1.
Figure 4:
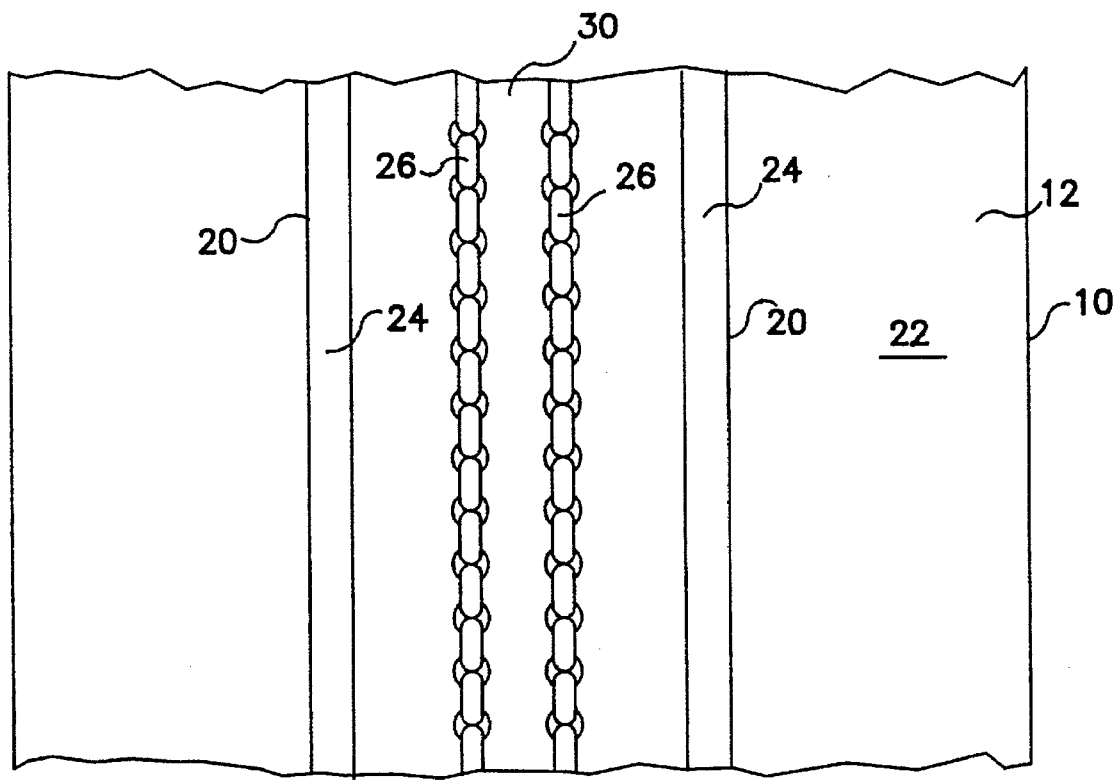
FIG. 4 is an top view of a portion of the grip of FIG. 1, on the same scale as FIG. 3.

FIGS. 1–4 illustrate a first embodiment of a grip 10 that includes a thin layer 12 of a polymeric material, and a backing 14 made of a porous material, as best shown in FIG. 3. The upper strip 12 is preferably made of polyurethane, but it may also be other suitable elastomeric grip materials such as natural rubber, thermoplastic rubber, thermoplastic urethane, or thermoplastic olefin. The backing 14 is preferably a inorganic, non-woven felt, but it may be made of other suitable materials as desired.

In an exemplary embodiment for tennis; racquets, the grip 10 is approximately 25 mm wide and 1100 mm long, although these dimensions may be varied. The opposed edges 16a, 16b of the grip 10 are bevelled in a known manner, as shown in FIG. 3. When the grip 10 is wound on a handle, the bevelled edges 16a, 16b allow successive wraps to partially overlie one another, preventing gaps or built-up areas, as can be seen from FIG. 2. The foregoing structure is well known and need not be described further.

In accordance with the present invention, the grip 10 includes one or more channels 20 that extend substantially the length of the grip. As shown in FIG. 3, the channels extend from the outer surface 22 of the top layer 12, through the top layer 12 to the upper surface 24 of the felt backing 14 so as to expose surface 24.

As used herein, the term "channel" means a groove that extends through the thickness of the polymer top layer to expose the backing; has a length of at least 3 mm; and an aspect ratio (length divided by width) greater than 3:1. In the preferred embodiments, however, the channels have lengths and aspect ratios greatly in excess of 3 mm and 3:1, respectively. Also, as used herein, the term "substantially the length of the grip" means that either one channel or a plurality of channels extend along at least a majority of the length of the grip 10.

In the exemplary embodiment of FIGS. 1–4, the grip 10 has a width of 25 mm and a pair of channels 20 spaced apart from one another by a distance of about 12 mm, each channel being located about 7 mm from the respective edge of the polymeric top layer 12. The polymeric top layer 12 has a thickness of approximately 0.4 mm and the felt layer 14 has a thickness of approximately 1.45 mm. The channels 20 have a width of slightly less than 1 mm. As shown, the ends of the channels 20 are spaced inwardly from the opposite longitudinal ends of the grip 10.

The embodiment of FIGS. 1–4 also includes stitching in the form of a pair of parallel stitch lines 26 that are coextensive with, and located between, the two channels 20. Moreover, as best shown in FIG. 3, the parallel stitch lines 26 are drawn together by a connecting stitch 31 on the bottom surface of the felt backing 14. As a result, as shown in FIG. 3, the portion 30 of the polymeric top layer 12 located between the stitch lines 26 is pulled together so as to create a raised section. After stitching, preferably double sided adhesive tape is applied to the bottom surface of the felt backing 14 to help facilitate wrapping the grip 10 onto a sports racquet handle.

FIG. 2 shows the grip 10 wrapped in a conventional manner on a handle of a tennis racquet. The grip 10 is wrapped helically, starting from the bottom, or butt end, of the handle so that the bottom edge 16a of each successive wrap overlies the top edge 16b of the previous wrap, terminating just above the channel 20a of the previous wrap. In this manner, both channels 20 remain exposed.

The resulting handle, again referring to FIG. 2, includes an absorbent textured outer surface defined by the channels 20, the stitching 26, and the raised area 30 to provide a novel tactile sensation for the hand when gripping the racquet, as well as a novel racquet appearance, particularly when the exposed upper surfaces 24 of the felt backing are a different, and particularly contrasting color relative to the color of the polymeric top layer.

The grip 10 is preferably formed by first forming the layer 12 and backing 14 in a conventional manner. For example, a thin layer of polyurethane is formed over a sheet of felt, which is then cut into strips of a size shown. Thereafter, the edges of the grip are bevelled as shown in FIG. 3.

Thereafter, the stitching 26 is added, and the two channels are machined into the grips. The machining is most preferably is performed using a rotary device with a thin cutting disc attachment. The stitching 26 and machining to form the channels 20 are preferably done after the sheet is cut into strips.

Figure 7:
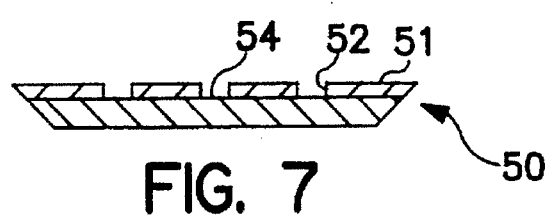
FIG. 7 is a cross-sectional view of the grip of FIG. 5, taken through lines 7—7 of FIG. 5.
Figure 5:
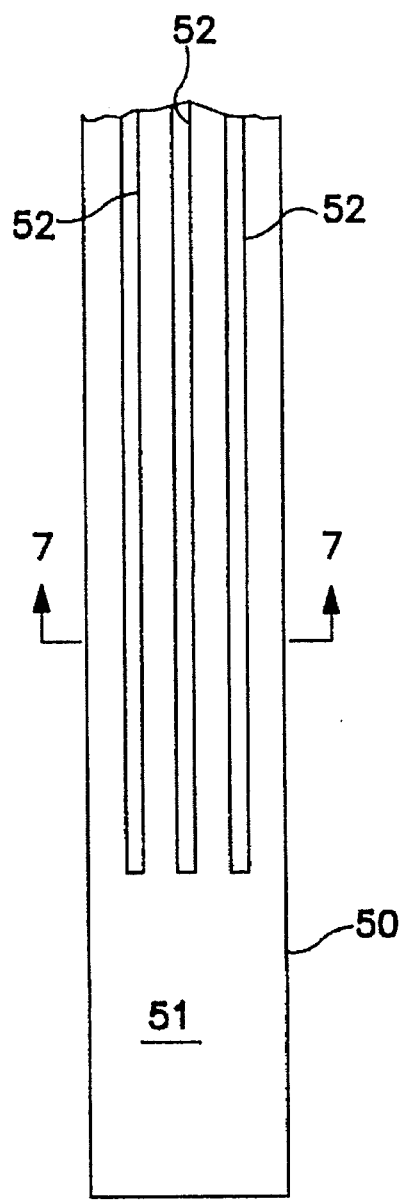
FIG. 5 is a top view of an alternative embodiment of a grip.
Figure 6:
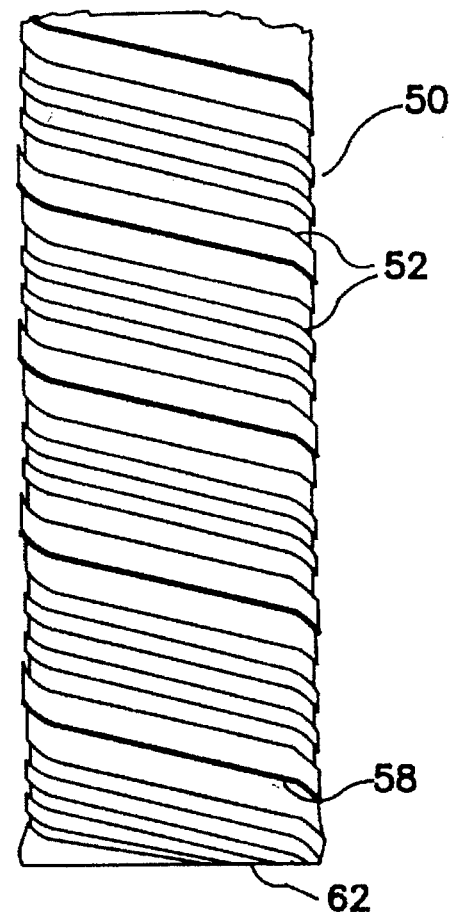
FIG. 6 is a front view of a tennis racquet handle, having the grip of FIG. 5 wound thereon.

FIGS. 5–7 illustrate an alternative embodiment of a grip 50, which includes a polyurethane top layer 51 having three parallel channels 52 which, as shown in FIG. 7, expose the upper surface 54 of the felt backing layer 56. In this embodiment, the three channels, each of which is about 2 mm in width, are evenly spaced across the grip width.

As shown in FIG. 6, the channels 52 provide an absorbent textured surface on the handle, although the depth of the grooves formed by channels 52 has been exaggerated somewhat in the figure to illustrate the textured surface.

Figure 8:
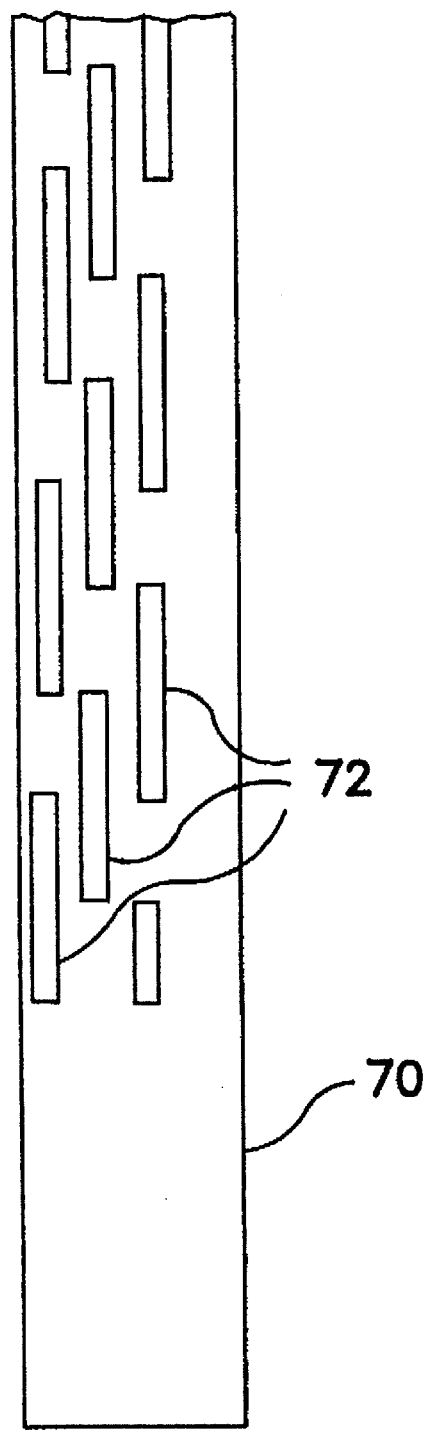
FIG. 8 is a top view of another alternative embodiment of a grip.

The grip 70 of FIG. 8 is similar to FIG. 5, except that the channels 52 are discontinuous segments. As shown, at any given axial location (excepting the ends of the grip) two channel segments are present. Thus, the channel configuration (if not each individual channel) extends continuously along the grip, excepting the end portions, so that when wrapped on a handle the entire gripping portion of the handle will have an absorbent textured surface formed by the channels 72.

The foregoing represents a description of the preferred embodiments. Variations and modifications will be apparent to persons skilled in the art, without departing from the inventive concepts shown herein. For example, although in the exemplary embodiments the channels are oriented axially, the channels may be oriented at one or more angles to the axis, for example in a herringbone pattern. Such arrangement will still accomplish the basic purpose of the channels in exposing a substantial area of the underlying backing material to help remove moisture and provide a pleasing aesthetic appearance. Also, although the preferred embodiments have been described with reference to a tennis racquets, the grip can be used in other sports racquets such as squash, badminton, racquetball, paddleball, or platform tennis, in other sports implements such as baseball or softball bats, table tennis paddles, or in other implements generally which include an elongated handle about which a grip may be wrapped. All such modifications and variations are intended to be within the scope of the invention, as defined in the following claims.

I claim:

1. A grip for a handle of an implement comprising:
   a thin layer of polymeric material having an outer surface and a longitudinal axis; and
   a backing material having an upper surface bonded to said thin layer, said backing material being porous;
   wherein said grip is sized for wrapping helically about an elongated handle such that said backing material contacts the handle and said layer outer surface forms a gripping surface for the hand; and wherein said grip has channel means comprising at least one channel, each channel of said channel means extending from the layer outer surface through said layer to expose the backing upper surface, thereby allowing moisture to pass directly to said backing material, and wherein said channel means extend generally axially and are substantially coextensive with the length of said grip.

2. A grip according to claim 1, wherein said channel means comprises at least one generally axially oriented channel extending substantially the length of said grip.

3. A grip according to claim 1, wherein said channel means comprises a pair of parallel, generally axially oriented channels extending substantially the length of said grip.

4. A grip according to claim 3, further comprising stitching running generally parallel to, coextensive with, and between said two channels, said stitching providing a texture on the outer surface of said grip.

5. A grip according to claim 4, wherein said stitching comprises a pair of parallel stitch lines having means for compressing the portion of said outer surface located therebetween to create a raised section, thereby forming further texture on the outer surface of said grip.

6. A grip according to claim 1, wherein said layer is a first color and the backing material upper surface exposed by said channel means is a second color.

7. A grip according to claim 1, wherein said channel means comprises a plurality of generally axially oriented channels.

8. A grip for a handle of a sports racquet, such as a tennis racquet, a squash racquet, a badminton racquet, or a racquetball racquet, of the type having an elongated handle, comprising:

a thin layer of synthetic material having an outer surface; and a backing material having an upper surface bonded to said thin layer, said backing material being porous;

wherein said grip has an axial length in the range of 600–1500 mm, depending upon the type of racquet handle for which the grip is intended; and a width in the range of 20–30 mm;

wherein said grip has channel means comprising at least one channel, each channel of said channel means extending from the thin layer outer surface through said layer to expose the backing upper surface, thereby allowing moisture to pass directly to said backing material, and wherein said channel means extend generally lengthwise and are substantially coextensive with the length of said grip.

9. A grip according to claim 8, wherein said channel means comprises at least one generally axially oriented channel extending substantially the length of said grip.

10. A grip according to claim 8, wherein said channel means comprises a pair of parallel, generally axially oriented channels extending substantially the length of said grip.

11. A grip according to claim 10, further comprising stitching running generally parallel to, coextensive with, and between said two channels, said stitching providing a texture on the outer surface of said grip.

12. A grip according to claim 11, wherein said stitching comprises a pair of parallel stitch lines having means for compressing the portion of said outer surface located therebetween to create a raised section, thereby forming further texture on the outer surface of said grip.

13. A grip according to claim 8, wherein said strip is a first color and the backing material upper surface exposed by said channel means is a second color.

14. A grip according to claim 8, wherein said channel means comprises a plurality of generally axially oriented channels.

\* \* \* \* \*